Oct. 31, 1933.  S. R. BUMPASS  1,932,615
WINDSHIELD WASHER AND WIPER
Filed June 11, 1932
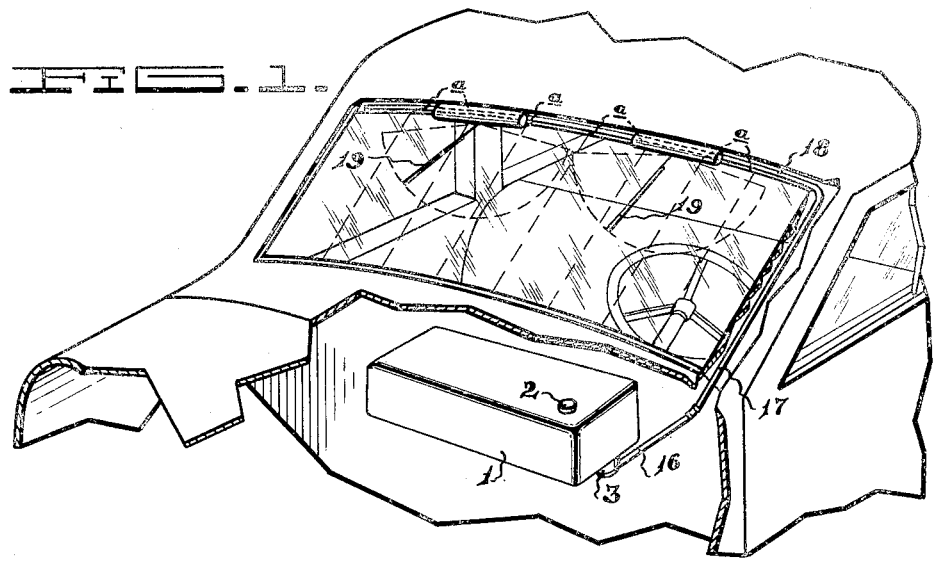
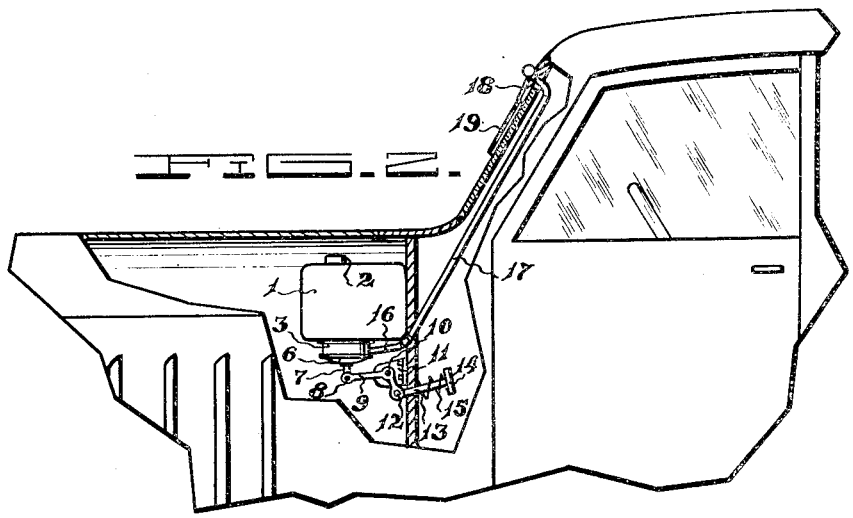
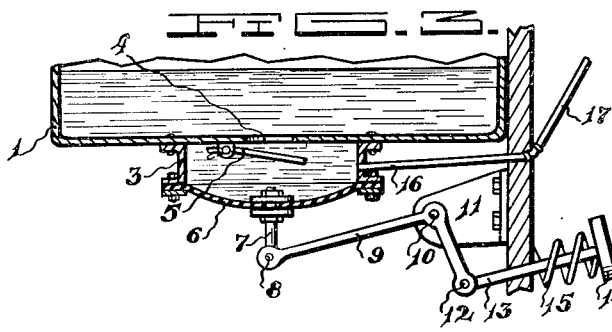
Stewart R. Bumpass.
INVENTOR
BY
ATTORNEY Patented Oct. 31, 1933

1,932,615

UNITED STATES PATENT OFFICE 1,932,615

WINDSHIELD WASHER AND WIPER

Stewart R. Bumpass, Dallas, Tex.

Application June 11, 1932. Serial No. 616,594

1 Claim. (Cl. 20—40.5)

This invention relates to windshield cleaners and it has particular reference to a manually operated device which will spray fluid upon the windshield, when actuated by the operator of the vehicle.

The principal object of the invention is to provide in a device of the character specified, a mechanism which will spray a predetermined amount of fluid, either water or other suitable liquid, upon the outer surface of the windshield, which, with the assistance of the conventional windshield wiper, will clear the glass of dust, mud or other foreign matter and thereby increase the visibility through the windshield.

Another object of the invention is the provision of a mechanism for the purpose specified which is compact and dependable, easily operated and normally concealed from view beneath the hood of the automobile.

Yet another object of the invention is to provide in combination with the other mechanism, a novel fluid pump especially adapted to the purpose specified herein.

With the foregoing objects as paramount, the invention has particular reference to its salient features of construction and arrangement of parts, which will become manifest as the description proceeds, taken in connection with the accompanying drawing, wherein:—

Figure 1 is a perspective view of the invention installed in an automobile.

Figure 2 is an elevational view, and

Figure 3 is a cross sectional view of the fluid container and the actuating mechanism.

Referring to the drawing, 1 denotes a fluid container or reservoir, preferably located under the hood of the vehicle as shown and having a conveniently located filler cap 2. Rigidly secured beneath the container 1 is a second container or subsidiary reservoir 3 which communicates with the container 1 through the opening 4, as shown in Figure 3. A downwardly opening check valve 5 is attached to the bottom of the container 1. The bottom of the container 3 is composed of a replaceable diaphragm or compressible member 6 of rubber or other suitable material.

Secured to the center of the diaphragm 6 is a vertical rod 7 pivotally connected at 8 to the longer arm of a bell crank 9. The bell crank 9 is pivotally connected at 10 to a bracket 11. The shorter arm of the bell crank 9 is pivoted at 12 to the rod 13, which is secured at its upper end to the disk 14. The mechanism is returned to inoperative position by means of the spring 15.

A pipe 16 communicates with the chamber 3 and connects with a pipe 17 which extends upward within the hollow standards of the windshield, and then across the top of the windshield as shown in Figure 1, forming a horizontal section 18 which is perforated along its under portion at various points $a$ above the paths swept by the windshield wipers 19.

The operation of the device is as follows:

The container 1 is first filled with water, or when necessary, any of the well known fluids for preventing accumulation of sleet on the windshield. The downwardly opening check valve 5 allows the fluid to flow freely into the container 3 below the container 1. When it is desired to clear the windshield of dust, mud or other foreign matter, the pedal 4 is depressed which actuates the bell crank 9 to raise the diaphragm 6. The pressure so produced in the chamber 3 closes the check valve 5 and the fluid is forced under pressure through the pipes 16, 17 and 18 and flows downwardly on the windshield through the perforations $a$. The fluid tends to flush away foreign matter and enables the wipers 19 to wipe the glass clean.

When pressure is removed from the pedal 14, the spring 15 returns the actuating mechanism to inoperative positions.

Manifestly, the construction shown and described is capable of considerable modification and such modification as is considered within the scope and meaning of the appended claim is also considered within the spirit and intent of the invention.

What is claimed is:

In a windshield cleaner the combination comprising a fluid reservoir and a fluid distributing means connected to the windshield, a subsidiary reservoir below said fluid reservoir and having a fluid passage therebetween, a downwardly opening check valve in control of said fluid passage, said valve being held normally open by gravity, a flexible bottom on said subsidiary reservoir and means for flexing said bottom whereby to close said check valve and to force predetermined quantities of fluid from said subsidiary reservoir to said distributing means.

STEWART R. BUMPASS.